ic Mar. 17, 1953

2,631,963

UNITED STATES PATENT OFFICE 2,631,963

VETERINARY THERAPEUTIC COMPOSITION FOR THE CONTROL OF ENTEROHEPATITIS

Robert P. Parker, Somerville, and Richard D. Vartanian, Bound Brook, N. J., assignors to American Cyanamid Company, New York, N. Y., a corporation of Maine No Drawing. Application July 19, 1950, Serial No. 174,794

6 Claims. (Cl. 167—53.1)

This invention relates to a new composition of matter. More particularly, it relates to a dispersible and wettable composition containing an aminonitroheterocycle and to methods of preparing the same.

One of the most destructive diseases in turkey husbandry is enterohepatitis (blackhead). The disease is caused by a protozoan organism called *Histomonas meleagridis* harbored in the egg of cecal worms common to poultry such as turkeys and chickens. When a new flock is allowed to roam on land where turkeys or chickens formerly were raised, this disease often manifests itself with great rapidity and the mortality in a flock of young birds may reach 80% or higher.

It has been found that certain aminonitroheterocycles, hereinafter described, are effective both as a prophylactic and in the therapeutic treatment of blackhead disease in turkeys. These compounds were found to be effective in some 0.01% or less to 1.5% of the total substance ingested by the turkeys. Generally they are administered as a part of the diet. In raising turkeys the food is often changed several times from a mash to a mixture of grains, pellets, etc. and to be continuously effective as a prophylactic obviously the compounds must be available in each type of food. Since the food is often varied, this method is costly and inconvenient. Also when therapeutic levels of the drug are required the higher content sometimes renders the food unpalatable to the birds. In fact, when the birds have blackhead disease they will often eat very little food but will drink water. It is therefore more desirable that the aminonitroheterocycles be administered in the drinking water.

The aminonitroheterocycles, when mixed with water, generally float on top of the water and dissolve very slowly so that considerable time, agitation and effort are necessary to obtain solution of sufficient drug to give therapeutic activity. Salts of these compounds have been tried, however, they are not too effective probably due to the fact that the salts themselves are not as therapeutically effective as the base compounds and in dilute water solution the acid salts are unstable and hydrolyze. It is therefore highly desirable that the aminonitroheterocycles be quickly soluble in water and give an aqueous solution which is therapeutically effective as well as being palatably acceptable.

We have found that a composition of matter containing the aminonitroheterocycles and a partially solubilized uncrystallizable polysaccharide will produce a composition which is readily dispersible and immediately soluble in water and which produces a therapeutically active solution. The further addition of a non-toxic water soluble diluent may aid in producing the desired properties. The partially solubilized uncrystallizable polysaccharide forms a coating over the ultimate particles of the aminonitroheterocycles and thus prevents them from coalescing, aggregating or cementing with each other during subsequent drying and resolution operations. Furthermore, particles so treated are not hydrophilic but are provided with a hydrophilic surface coating on the particles so that after drying they are more readily wet-out in water and therefore are more rapidly dissolved in water.

The aminonitroheterocycles which we have found effective in the treatment of blackhead disease are those having the following formula:

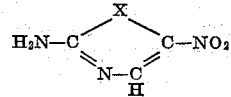

in which X may be one of the following linking groups —N=CH—, —CH=CH— or —S—. The compounds included in the general formula above would be those such as 2-amino-5-nitrothiazole, 2-amino-5-nitropyrimidine, 2-amino-5-nitropyridine, and the like.

The partially solubilized uncrystallizable polysaccharides are primarily colloidal materials which form films around the particles of aminonitroheterocycles and include the dextrins such as amylodextrin, erythrodextrin, achroödextrin, white dextrin, yellow dextrin, and the like. Partially solubilized cellulose derivatives such as hydroxyethyl cellulose, carboxymethyl cellulose, etc. can also be used in the process of the present invention.

As non-toxic water soluble diluents which may, under certain conditions, be found advantageous in speeding up the dispersion of the dried solid product in water are substances such as the commonly soluble carbohydrates, sucrose, dextrose, glucose, cerelose, and the like. We can also use salts such as sodium chloride, potassium chloride, etc. Wetting agents such as polyoxyethylene sorbitan monolaurate can also be used. However, best results have been obtained by using urea as a diluting agent. The composition containing the aminonitroheterocycle and a partially solubilized uncrystallizable polysaccharide will disperse and dissolve readily and satisfactorily at recommended therapeutic doses in water. Addition of the water soluble diluting agent obtains optimum results, but may create problems because of hygroscopic characteristics. It is a matter of choice and conditions that balance the addition or non-addition of these water soluble diluting agents.

In using urea we usually prefer to thoroughly mix the aminonitroheterocycle with a partially solubilized uncrystallizable polysaccharide as a paste, dry the product and then adjust the composition to the desired strength by the addition of urea. It is preferred that urea be added after the drying since under some conditions of drying, the presence of urea may cause charring.

The addition of wetting agents to lower surface tension may be helpful in improving the rate of wetting of the dried products although this is not necessary.

In preparing the preferred composition of the present invention the aminonitroheterocycles in the form of a wet filter cake obtained in its process of manufacture is mixed with a partially solubilized uncrystallizable polysaccharide and a small amount of water sufficient to form a viscous paste. The polysaccharide may be from 20% of the combined weight of the mixture up to about 80%. We prefer, however, to use from 40% to 60% of the mixture as polysaccharide. This paste is then made uniform by passing through an ink mill, a dough-mixer, a ball mill or high speed agitator which insures thorough mixing. When the paste is of uniform consistency and the products thoroughly mixed, it is dried by customary procedures such as in an oven, on a drum dryer or by spray drying. After drying, the product is ground up and the therapeutic activity may be adjusted, if desired, by mixing with a non-toxic water soluble diluent such as urea. The finished product is readily dispersible and immediately soluble in water to produce therapeutic levels of the aminonitroheterocycles.

The following examples show various compositions of matter illustrating instantly dispersible, wettable and soluble preparations of aminonitroheterocycles.

Example 1

To 225 gms. of yellow dextrin powder is added 150 gms. of 2-amino-5-nitrothiazole filter cake (75 gms. real) and the mixture is thoroughly mixed. 100 gms. of water is added with stirring and when uniform, the paste is given several passes over a 3-roll ink mill. The milled paste is dried in a vacuum oven at 60° C. The dried product is then ground to a powder. It wets-out rapidly and dissolves readily in water as compared with the original 2-amino-5-nitrothiazole which floats on the surface of the water, wets only very slowly and dissolves even more slowly.

Example 2

60 gms. of yellow dextrin is added to 120 gms. of 2-amino-5-nitrothiazole filter cake (60 gms. real) and mixed thoroughly. To this is added 10 gms. of water and when uniform, several passes are made over a 3-roll ink mill. The milled paste is dried in a vacuum oven at 60° C. The dried product is then ground to a powder.

Example 3

To a mixture of 60 gms. of yellow dextrin and 150 gms. of 2-amino-5-nitrothiazole filter cake (75 gms. real) is added with stirring 30 gms. of water. Several passes over a 3-roll ink mill are made and the milled paste diluted with 60 gms. of water.

Example 4

A mixture of 12 gms. of hydroxyethylcellulose (low or medium viscosity grade) powder and 150 gms. of 2-amino-5-nitrothiazole filter cake (75 gms. real) is stirred with 30 gms. of water. The thick paste is passed over a 3-roll ink mill several times and then diluted with 108 gms. of water. The resulting paste rapidly disperses in water and quickly dissolves.

Example 5

With continued high speed stirring 80 gms. of yellow dextrin is added to 110 gms. of water and 214 gms. of 2-amino-5-nitrothiazole filter cake (120 gms. real) is stirred in gradually. 400 gms. of yellow dextrin and 190 gms. of water are alternately added to the above mixture with continued stirring. The paste is finally stirred at high speed for 10 minutes and transferred to a stainless steel drying tray. The paste is dried at 55° C. in a forced draft oven. The dried product is ground to a fine powder.

Example 6

With continued high speed stirring 180 gms. of yellow dextrin and 750 gms. of 2-amino-5-nitrothiazole filter cake (420 gms. real) is added to 50 gms. of water. The paste is stirred at high speed and finally dried in a stainless steel drying tray at 55° C. in a forced draft oven. The dried product is ground to a fine powder.

Example 7

10 gms. of 2-amino-5-nitropyridine powder is mixed with 15 gms. of yellow dextrin and 10 gms. of water. After stirring thoroughly to a smooth paste, the paste is dried in a forced draft oven at 55° C. The dry product is ground to a fine powder.

Example 8

A mixture of 10 gms. of 2-amino-5-nitropyrimidine powder and 15 gms. of yellow dextrin is made into a paste with 9 gms. of water. The paste is stirred thoroughly and dried in a forced draft oven at 55° C. The dry product is then ground to a fine powder. As such it dissolves much more rapidly than the untreated starting material.

Example 9

Into a dough-mixer is placed 750 gms. of 2-amino-5-nitrothiazole powder and 750 gms. of dextrin and with continued mixing, 500 gms. of water is incorporated along with 22.5 gms. of Tween 20 (polyoxyethylene sorbitan monolaurate). The mixing is continued until smooth. The paste is transferred to a stainless steel drying tray and dried in a vacuum oven at 60° C. The dried product is ground to a powder.

Example 10

Into a dough-mixer containing 1340 gms. of 2-amino-5-nitrothiazole filter cake which is equivalent to 750 gms. of real 2-amino-5-nitrothiazole is placed 750 gms. of yellow dextrin with continued mixing. The mixing is continued until a smooth paste is obtained. The paste is transferred to a stainless steel tray and dried in a vacuum oven at 55° C. The dried product is crushed into small granules.

Example 11

200 gms. of the dry product prepared in Example 10 is mixed with 200 gms. of sucrose and this mixture ground to a powder by means of a micropulverizer using a screen having ⅛ inch diameter perforations. The product obtained is even more rapidly dispersible in water than is the product of Example 10.

Example 12

Into a dough-mixer is placed 800 gms. of 2-amino-5-nitrothiazole powder, 400 gms. of dextrin and 400 gms. of urea and mixed thoroughly. 130 gms. of water is added with continued mixing and the mixing is continued until smooth. The paste is transferred to a stainless steel tray and dried in a vacuum oven at 60° C. The composition, when pulverized, will immediately wet-out and dissolve in water.

We claim:

1. A readily dispersible, water wettable composition of matter effective in the control of enterohepatitis comprising dextrin-coated particles of an aminonitroheterocyclic compound having the formula:

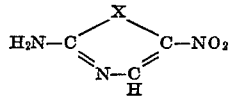

in which X is one of the group consisting of —N=CH—, —CH=CH—, and —S—, said particles characterized in that they are quickly soluble as compared with the uncoated particles.

2. A water wettable, readily dispersible composition of matter effective in the control of enterohepatitis, in particle form, said composition comprising 20% to 80% of a dextrin-coated aminonitroheterocyclic compound having the formula:

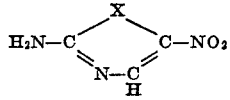

in which X is one of the group consisting of —N=CH—, —CH=CH—, and —S—, said particles characterized in that they are quickly soluble as compared with the uncoated particles.

3. A veterinary therapeutic composition for the control of enterohepatitis, readily dispersible in water, comprising dextrin-coated particles of 2-amino-5-nitrothiazole characterized in that said particles are quickly soluble as compared with the uncoated particles.

4. A veterinary therapeutic composition for the control of enterohepatitis, in the form of particles, readily dispersible in water, comprising about 50% 2-amino-5-nitrothiazole coated with about 50% of a dextrin and characterized in that said particles are quickly soluble as compared with the uncoated particles.

5. A veterinary therapeutic composition for the control of enterohepatitis, in particle form, readily dispersible in water, comprising a major portion of 2-amino-5-nitropyridine particles coated with a minor portion of a dextrin, said particles characterized in that they are quickly soluble as compared with the uncoated particles.

6. A veterinary therapeutic composition for the control of enterohepatitis, in particle form, readily dispersible in water, comprising a major portion of particles of 2-amino-5-nitropyrimidine coated with a minor portion of a dextrin, and characterized in that said particles are quickly soluble as compared with the uncoated particles.

ROBERT P. PARKER.
RICHARD D. VARTANIAN.

REFERENCES CITED

The following references are of record in the file of this patent:

UNITED STATES PATENTS

| Number | Name | Date |
|---|---|---|
| 1,493,847 | Donath | May 13, 1924 |
| 2,166,868 | Jones | July 18, 1939 |
| 2,196,768 | Hiatt | Apr. 9, 1940 |
| 2,201,124 | Ehman | May 14, 1940 |
| 2,373,933 | Weeks | Apr. 17, 1945 |
| 2,531,756 | Waletzky | Nov. 28, 1950 |

FOREIGN PATENTS

| Number | Country | Date |
|---|---|---|
| 11,601 | Great Britain | of 1905 |
| 478,108 | Great Britain | Jan. 12, 1938 |

OTHER REFERENCES

Hollabaugh, Industrial and Engineering Chemistry, volume 37, October 1945, page 945.

Waletzky, Science, volume 111, June 30, 1950, pages 720 to 721.